June 28, 1938.   H. W. WILKERSON   2,122,388
TIRE DEMOUNTING UNIT
Filed July 19, 1937

H.W.Wilkerson
INVENTOR
BY Victor J.Evans & Co.
ATTORNEYS

UNITED STATES PATENT OFFICE 2,122,388

TIRE DEMOUNTING UNIT

Herman W. Wilkerson, Hearne, Tex.

Application July 19, 1937, Serial No. 154,493

2 Claims. (Cl. 157—6)

This invention relates to tire demounting units especially adapted for removing tires from rims of truck wheels and has for the primary object the provision of units of this character which may be readily secured on a wheel at selected places on the latter and each actuated to bring about pressure on the tire in a direction transversely of the rim to break said tire loose from the rim whereby the tire may be conveniently demounted for repair.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a side elevation illustrating units adapted to a tire and wheel and constructed in accordance with my invention.

Figure 1:
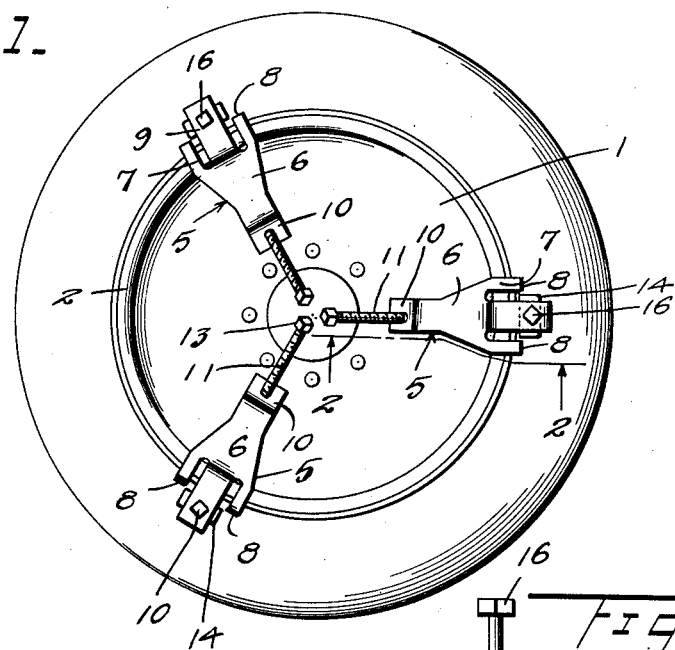
Figures 2, 3:
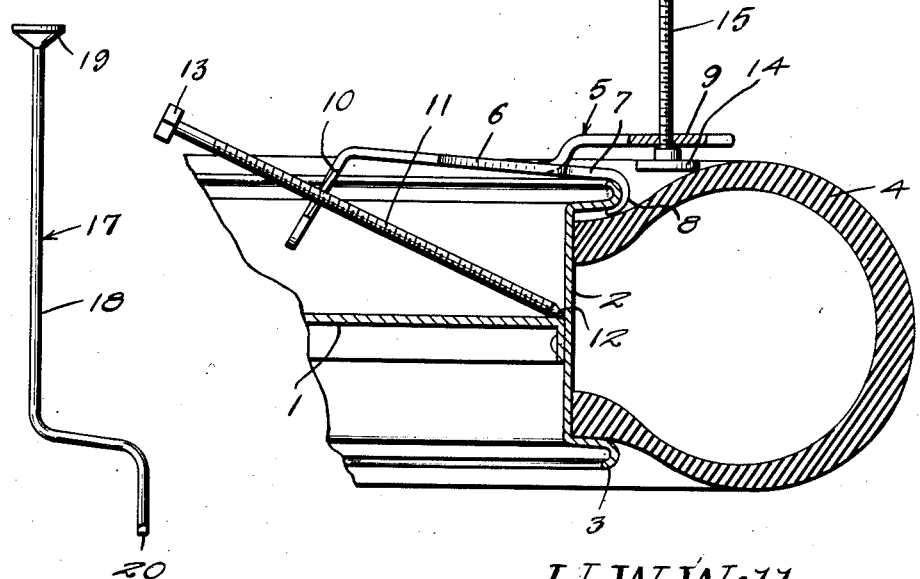
Figure 2 is a sectional view taken on the line 2—2 of Figure 1.
Figure 3 is a side elevation illustrating a tire tool.

Referring in detail to the drawing, the numeral 1 indicates a motor vehicle wheel preferably of the type employed on trucks wherein the rim 2 is non-demountable and provided with the usual tire engaging flanges 3. The character 4 indicates a pneumatic tire mountable on the rim and after the tire has been in use on the rim for a period of time it adheres to the rim and is very difficult to break loose from the rim and consequently renders the demounting of the tire extremely difficult. To loosen the tire from the rim units 5 are employed and form the subject matter of the present invention and each consists of a plate 6 having a bifurcated portion 7 which provides spaced hooks 8 to engage the flange of the rim 2, as shown in Figure 2. The plate 6 has integral therewith an extension 9 projecting beyond the hooks and offset from the plate 6 and provided with a screw threaded opening. An ear 10 is integral with the plate and is disposed angularly thereto and provided with a screw threaded opening to receive a threaded rod 11, one end of which is pointed, as shown at 12, and its opposite end provided with a wrench engaging head 13. The rod is adapted to be adjusted against the wheel and the rim, as shown in Figure 2, thereby tightly drawing the hooks 8 onto the flange of the rim with the extension 9 lying opposite a side wall of the tire. A presser plate 14 is secured to a screw threaded rod 15 threaded in the opening of the extension. Said rod 15 has a wrench engaging head 16. The rod 15 is adapted to be turned bringing the presser plate 14 against the side wall of the tire with sufficient pressure to break the tire away from the flange of the rim engaged by the hook. The free end of the extension 9 may be employed as a striking plate for driving the hook onto the flange of the rim. After the tire has been loosened from the flanged rim, a tool 17 may be employed for prying the beads of the tires over the flange of the rim and consists of a rod 18 having at one end a striking head 19 and its opposite end sharpened, as shown at 20. The sharpened end 20 is disposed laterally of the head 19 by bending the rod 18.

What is claimed is:

1. A tire unit comprising a plate, spaced hooks formed on said plate to engage a flange of a tire rim of a wheel, an extension formed on said plate and disposed laterally of the hooks and opposite a wall of a tire mounted on the rim, a rod threaded on said extension, a presser plate carried by said rod to engage and force the tire away from a flange of the rim by the rotation of said rod, an ear formed on the first plate and extending angularly thereto, a rod threaded on said ear and engaging the wheel and rim.

2. A tire unit comprising a plate, spaced hooks formed on said plate to engage a flange of a tire rim of a wheel, an extension formed on said plate and disposed laterally of the hooks and opposite a wall of a tire mounted on the rim, a rod threaded on said extension, a pressure plate carried by said rod to engage and force the tire away from a flange of the rim by the rotation of said rod, a second extension on the first plate and disposed angularly with respect thereto, and adjustable means on the second extension to engage the wheel.

HERMAN W. WILKERSON.